3,544,119
PIPE COUPLINGS
John Benjamin Glover, Stocksbridge, near Sheffield, England, assignor to The Hepworth Iron Company Limited
Filed Apr. 1, 1968, Ser. No. 717,836
Int. Cl. F16j *15/10*
U.S. Cl. 277—206                                     7 Claims

ABSTRACT OF THE DISCLOSURE

A slightly resilient synthetic plastic pipe coupling socket has an outer portion of larger diameter connected to the main socket portion by an annular wall and which with a slightly resilient synthetic plastic cap snapping on to the enlarged portion to form an inwardly-facing recess for a sealing ring which has flanged sides engaged by undercut sides of the recess.

---

Figure 1:
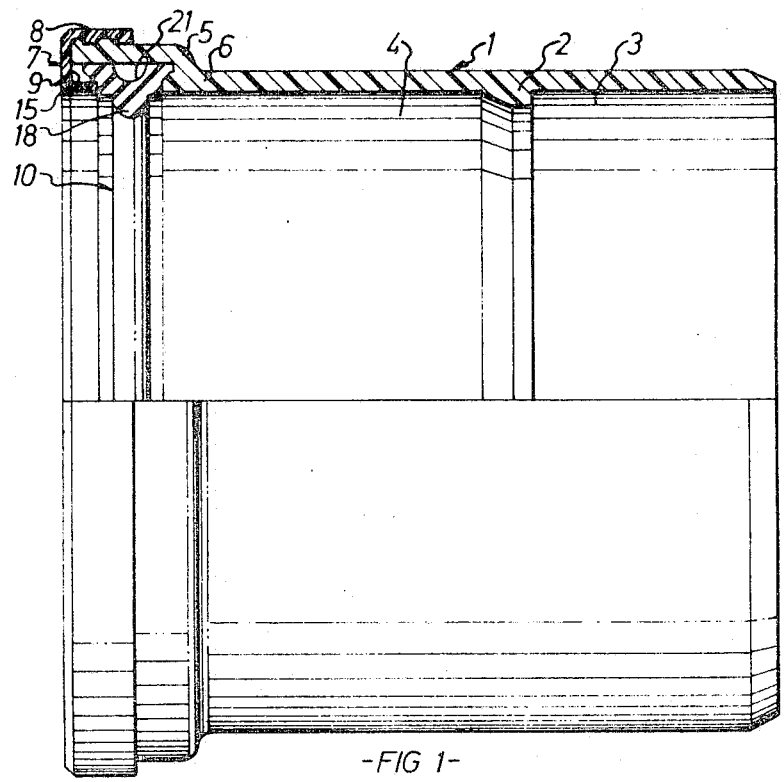

This invention relates to pipe couplings and more particularly to coupling sleeves for clayware or pitch-fibre or asbestos-cement piping, such as is used in sewers, drains and cable conduit, but is also applicable to synthetic plastic piping, being of the type in which a resilient sealing ring is housed in an inwardly-facing recess in a socket at one end of a slightly resilient synthetic plastic sleeve or at one end of a slightly resilient synthetic plastic pipe, for the sealing ring to be compressed or distorted upon insertion of the spigoted end of a pipe-length into the socket.

It is known to form the sealing ring with an inwardly-facing annular recess for a locking ring, to prevent the sealing ring from being dislodged, but the need for manufacture and assembly of such extra part, especially in addition to the difficulties and complexities in forming the inwardly-facing annular recesses in the socket and in the sealing ring, can prove both costly and inconvenient.

According to the present invention, a coupling socket for a spigot-and-socket pipe coupling comprises a slightly resilient synthetic plastic socket with an outer portion of larger diameter connected to the main socket portion by an annular wall, and a slightly resilient synthetic plastic cap having a skirt fitting closely round the outside of the outer socket portion, the skirt having at one end an inwardly-projecting annular flange forming with the outer socket portion and the annular wall an inwardly-facing recess for housing a sealing ring, and the skirt having at or towards the other end an inwardly-projecting rim engaging behind a shoulder on the outer socket portion, when the cap is pushed on to the outer socket portion, and the inside of the annular flange of the cap and the mutually facing side of the annular wall of the socket being grooved or undercut from the mouth of the recess, to receive flanges on or divergent sides of the body of a sealing ring having at least one annular sealing head projecting radially into the socket from the mouth of the recess. Thus the sealing ring is secure against the disturbance and, in a preferred form, having a symmetrical body, it does not matter which way round it is fitted into the recess. The sides of the head are preferably bevelled and blend into each other. The outer periphery of the sealing ring is preferably grooved, to provide a cavity for accommodation of sealing ring material displaced from the head upon insertion of a spigoted pipe end into the socket.

Outward radial pressure exerted on a sealing ring housed in the recess urges the outer socket portion towards the skirt of the cap, so as to improve, if anything, the engagement of the rim of the skirt behind the shoulder on the outer socket portion.

The skirt of the cap may be provided with an inwardly-projecting rib parallel to the rim and engaging behind another shoulder or rib on or in a groove in the outer socket portion.

The outside of the outer socket portion may be tapered down slightly from the shoulder, to assist fitting of the cap by gradual distending of the inwardly-projecting rim to pass over the shoulder, and the skirt may be flared to correspond to the taper.

The inside of the rim or projections may be tapered or bevelled, also to assist fitting of the cap.

The shoulder at the outer socket portion may be the outer part of the outside of the annular wall between the outer socket portion and the main socket portion, or it may be a face spaced from and parallel to the outside of the annular wall by the thickness of the inwardly projecting rim.

The socket may itself be a short length of enlarged diameter on the end of a synthetic plastic pipe (with the outer socket portion of still larger diameter), the shoulder between the socket and the main length of pipe being abutted by a spigoted pipe end of a similar synthetic plastic pipe. Alternatively, the socket may be one end of a sleeve the other end of which is sealed and secured by adhesive or is a force fit on one end of a clayware or like pipe. Again, the socket may be one end of a sleeve the other end of which is formed with a similar socket with cap, to receive adjacent ends of plain-ended synthetic plastic pipe-lengths or clayware or like pipe-lengths, and the sleeve may be provided at its mid-length with one or more small integral internal projections or a flange or may be otherwise constricted internally to less than the outside diameter of pipe-lengths to which it is intended to be fitted for facilitating location of the sleeve on a pipe-end to which it is first applied.

Suitable materials for the socket and cap, sleeve or pipe, are modified or unmodified "rigid" polyvinyl chloride, polycarbonate, polyacetal, acrylonitrile, butadiene styrene, and polypropylene, while a suitable material for the sealing ring is natural or synthetic rubber, e.g., butyl rubber, or a like elastomeric material.

Figure 2:
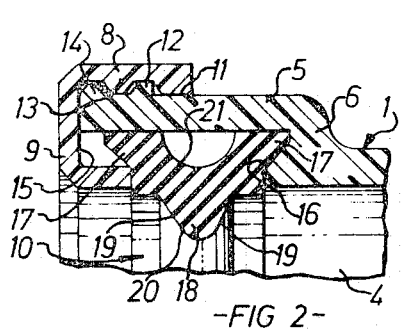
Figure 4:
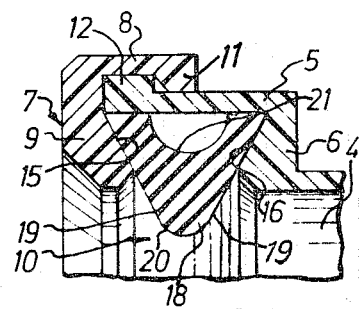
Figure 3:
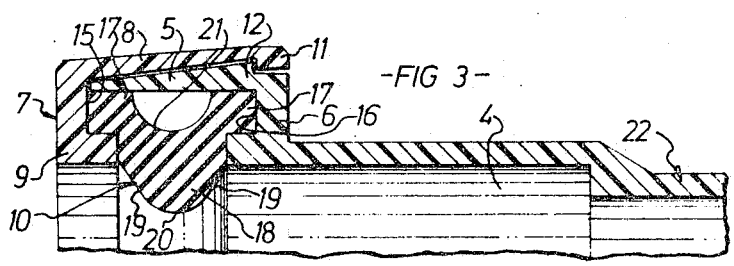

Three embodiments of the invention will now be described by way of example only, with reference to the accompanying drawings, in which FIG. 1 is a part-sectional elevation of a pipe coupling sleeve in accordance with the invention;

FIG. 2 is an enlargement of part of FIG. 1;

FIG. 3 corresponds to FIG. 2, but shows another embodiment incorporated in accordance with the invention in the socket of a pipe; and FIG. 4 also corresponds to FIG. 2 and shows yet another embodiment.

In FIG. 1 a pipe coupling sleeve 1 of synthetic plastic material has an inwardly projecting flange 2 dividing the sleeve into two parts, one part 3 being adapted to be fitted on a pipe-length (not shown) and secured thereon, e.g., by solvent cement welding, and the other part 4 being a socket with an outer portion 5 of larger diameter connected to the main portion by an annular wall 6, and a cap 7 of similar material has a skirt 8 fitting closely around the outside of the outer socket portion. The skirt has an inwardly-projecting annular flange 9 forming with the outer socket portion 5 and the annular wall 6 an inwardly-facing recess for housing a sealing ring 10, and the skirt also has an inwardly-projecting rim 11 engaging behind a shoulder 12 on the outer socket portion (see also FIG. 2) when the cap is pushed on to the outer socket portion, an inwardly-projecting rib 13 parallel to the rim 11 also being provided on the skirt for engagement behind another shoulder 14 on the outer socket portion. The inside 15 of the annular flange 9 and the mutually facing side 16 of the annular wall 6 are grooved or undercut from the mouth of the recess, to receive flanges 17 on the sealing ring 10, which is thus secured against disturbances upon insertion of a spigoted pipe end (not shown) into the socket 4 and, having a symmetrical body, it does not matter which way round the sealing ring is fitted into the recess. An annular sealing head 18 has bevelled sides 19 blending into each other at 20. The outer periphery of the sealing ring is preferably grooved at 21, to provide a cavity for accommodation of sealing ring material displaced from the head 18 upon insertion of a spigoted pipe end into the socket 4.

In FIG. 3, like reference numerals denote like parts, but it will be seen that the socket 4 is itself an enlarged integral part on one end of a synthetic plastic pipe-length 22.

In FIG. 4, the undercut sides 15, 16 of the annular flange 9 and the annular wall 6, respectively, match the inclination of the divergent sides 19 of the sealing ring 10.

What I claim is:

1. A coupling socket for a spigot-and-socket pipe coupling comprising a slightly resilient synthetic plastic socket with an outer portion of larger diameter connected to the main socket portion by an annular wall, a slightly resilient synthetic plastic cap having a skirt fitting closely round the outside of said outer socket portion, said skirt having at one end an inwardly-projecting annular flange forming with said enlarged socket portion an inwardly-facing recess, a sealing ring housed in said recess and projecting radially into said socket from the mouth of said recess, said outer socket portion having an outwardly extending first shoulder thereon, and the other end of said skirt having an inwardly-projecting first rim engaging behind said first shoulder on said outer socket portion when said cap is pushed on to said outer socket portion, the inside of said annular flange of said cap and the mutually facing side of said socket annular wall in the recess being undercut, the body of said sealing ring having outwardly diverging flanges received in the undercut sides of said recess, and said sealing ring body having an annular groove of semicircular cross-section round its outer periphery.

2. A pipe coupling socket as in claim 1, wherein said sealing ring includes a sealing head having bevelled sides which blend into each other and into the outer sides of said sealing ring body flanges, and wherein the undercut sides of said annular flange of said cap and said annular wall of the socket respectively match the inclination of said sealing ring outer sides.

3. A pipe coupling socket as in claim 1, wherein said divergent flanges of said sealing ring body fit respectively within the annular flange undercut of said cap and the annular wall undercut of the socket.

4. A pipe coupling socket as in claim 1, wherein the shoulder on said outer socket portion has a face which is parallel to the exterior of the socket annular wall and is spaced therefrom by the width of said first inwardly-projecting rim.

5. A pipe coupling socket as in claim 4, wherein the outside of the outer socket portion is slightly tapered downwardly from said first shoulder, and wherein said skirt is flared to correspond to said taper of said outer socket portion.

6. A pipe coupling socket as in claim 1, wherein said first shoulder on said outer socket portion has a face parallel to the exterior of said outer socket annular wall and is spaced therefrom by an amount exceeding the width of said first inwardly-projecting rim.

7. A pipe coupling socket as in claim 6, wherein a second shoulder is provided on the outside of said outer socket portion parallel to said first shoulder, and wherein a second inwardly-projecting rim parallel to said first inwardly-projecting rim is provided on said skirt for engagement behind said second shoulder on said outer socket portion.

References Cited

UNITED STATES PATENTS 3,075,792    1/1963    Franck _____ 285—349 X

FOREIGN PATENTS 6,610,264    2/1967    Netherlands.

LAVERNE D. GEIGER, Primary Examiner

J. S. MEDNICK, Assistant Examiner

U.S. Cl. X.R.

277—207; 285—345, 379